United States Patent
Adachi

(10) Patent No.: US 8,674,573 B2
(45) Date of Patent: Mar. 18, 2014

(54) DIRECT-CURRENT MOTOR AND HUB UNIT

(75) Inventor: Ryohei Adachi, Hyogo (JP)

(73) Assignees: Sanyo Electric Co., Ltd., Osaka (JP); Sanyo Consumer Electronics Co., Ltd., Tottori (JP)

( * ) Notice: Subject to any disclaimer, the term of this patent is extended or adjusted under 35 U.S.C. 154(b) by 236 days.

(21) Appl. No.: 13/168,214

(22) Filed: Jun. 24, 2011

(65) Prior Publication Data

US 2012/0025677 A1  Feb. 2, 2012

(30) Foreign Application Priority Data

Jul. 29, 2010  (JP) ................................. 2010-170961

(51) Int. Cl.
*H02K 5/04* (2006.01)
*H02K 7/14* (2006.01)
*H02K 7/116* (2006.01)
*H02K 15/16* (2006.01)
*H02K 1/18* (2006.01)
*B62M 6/65* (2010.01)
*H02K 5/173* (2006.01)

(52) U.S. Cl.
CPC .. *H02K 7/14* (2013.01); *H02K 5/04* (2013.01); *H02K 15/16* (2013.01); *H02K 7/116* (2013.01); *H02K 1/185* (2013.01); *B62M 6/65* (2013.01); *Y02T 10/86* (2013.01); *H02K 5/1732* (2013.01)
USPC ............ 310/89; 310/67 R; 310/75 C; 310/83; 310/91

(58) Field of Classification Search
CPC ......... H02K 1/185; H02K 5/04; H02K 16/16; H02K 5/1732; H02K 7/116; B62M 6/65; Y02T 10/86

USPC ............... 310/67 R, 89, 216.055, 216.049, 310/216.131, 216.083, 216.084, 216.127, 310/216.133, 400, 432, 75 C, 83, 91
IPC ...................................... H02K 5/04,7/14, 7/116
See application file for complete search history.

(56) References Cited

U.S. PATENT DOCUMENTS 4,801,831 A * 1/1989 Lewis ............................. 310/91
5,852,338 A * 12/1998 Boyd et al. ...................... 310/89

(Continued)

FOREIGN PATENT DOCUMENTS

| CN | 1754712 A | 4/2006 |
|----|-----------|--------|
| JP | 64-55030 | 3/1989 |
| JP | 2005-335535 A | 12/2005 |

OTHER PUBLICATIONS

Foreign Office Action issued on Nov. 21, 2013 with a partial English translation.

*Primary Examiner* — John K Kim
(74) *Attorney, Agent, or Firm* — Rabin & Berdo, P.C.

(57) ABSTRACT

In a motor, a motor case includes a first case and a second case separable from each other in a direction of an axis of a rotation shaft of a rotor. The first case and the second case each have cut-away portions extending parallel to the axis from a separation edge (open side edge) thereof. The separation edges of the first and second cases each have abutment portions not formed with the cut-away portions, and the abutment portions of the first case respectively abut against the abutment portions of the second case. The cut-away portions cooperatively define a plurality of windows disposed in a periphery of the motor case. The stator has a plurality of bulges projecting radially outward from a peripheral surface thereof in association with the windows.

4 Claims, 6 Drawing Sheets

(56) References Cited

U.S. PATENT DOCUMENTS

| | | | |
|---|---|---|---|
| 6,787,949 B2 * | 9/2004 | Bostwick et al. | 310/59 |
| 6,822,364 B2 * | 11/2004 | Suzuki et al. | 310/216.012 |
| 7,363,696 B2 * | 4/2008 | Kimura et al. | 29/596 |
| 7,375,450 B2 * | 5/2008 | Tanaka et al. | 310/216.004 |
| 7,472,770 B2 * | 1/2009 | Tomoshige et al. | 180/65.51 |
| 7,586,304 B2 * | 9/2009 | Hashimoto et al. | 324/207.26 |
| 8,076,892 B2 * | 12/2011 | Oguri et al. | 318/652 |
| 2005/0264111 A1 | 12/2005 | Tanaka et al. | |
| 2008/0258668 A1 * | 10/2008 | Oguri et al. | 318/538 |
| 2012/0025677 A1 * | 2/2012 | Adachi | 310/67 R |

\* cited by examiner

DIRECT-CURRENT MOTOR AND HUB UNIT

TECHNICAL FIELD

The present invention relates to a direct-current motor and a hub unit.

BACKGROUND ART

A hub unit is known, which includes a direct-current motor and is mounted on a wheel of an electrically assisted bicycle (see, for example, JP-A-2005-335535).

A hub unit disclosed in JP-A-2005-335535 essentially includes a motor including a stator and a rotor, and a hub accommodating the motor therein and rotatively driven by rotation of the rotor. A wheel on which the hub unit is mounted is rotated by the rotative driving of the hub.

The motor includes a motor housing (motor case) which retains the stator. The motor housing includes a pair of end plates disposed in opposed relation on opposite sides of a clad metal plate of the stator. The end plates are clamped against each other by bolts with the clad metal plate being held therebetween, whereby the stator is retained in the motor housing with its outer peripheral surface being open to an interior of the hub between the pair of end plates. In this case, even if coils of the stator generate heat, the overheat of the stator can be prevented by releasing the heat out of the motor housing between the pair of end plates.

The end plates respectively include bearings, which rotatably support opposite end portions of a rotation shaft of the rotor.

In the motor of the hub unit disclosed in JP-A-2005-335535, the clad metal plate of the stator is held between the pair of end plates of the motor housing. Therefore, the motor is liable to suffer from dimensional variations occurring in an opposing direction of the pair of end plates depending on the state of the clad metal plate clamped between the pair of end plates and an error in the thickness of the clad metal plate. The variations result in positional offset of the bearings of the respective end plates (in other words, the variations impair the parallelism between the bearings). If the bearings rotatably support the rotation shaft of the rotor with the positional offset, the bearings are liable to be strained.

SUMMARY OF INVENTION

In view of the foregoing, it is an object of the present invention to provide a direct-current motor which includes a stator retained in a motor case and is free from the overheat of the stator and the dimensional variations, and to provide a hub unit.

According to one aspect of the present invention, there is provided a direct-current motor, which includes: a rotor having a rotation shaft; a stator surrounding the rotor; and a motor case which accommodates the stator and retains the stator, the motor case including a first case and a second case separable from each other in a direction of an axis of the rotation shaft of the rotor, the first case and the second case each having a separation edge extending around the stator; wherein the first case and the second case each have cut-away portions provided at angular positions circumferentially generally equidistantly spaced from each other and each extending parallel to the axis from the separation edge; wherein the separation edge of the first case and the separation edge of the second case each have abutment portions not formed with the cut-away portions, the abutment portions of the first case respectively abutting against the abutment portions of the second case; wherein the cut-away portions of the first case and the cut-away portions of the second case cooperatively define a plurality of windows which are provided in a periphery of the motor case in circumferentially generally equidistantly spaced relation; wherein the stator has a plurality of bulges projecting radially outward from a peripheral surface thereof in association with the windows; wherein the bulges each have a fixing screw hole extending parallel to the axis for fixing the stator to the first case; wherein the first case has screw holes which are threadingly engaged with distal end portions of screws inserted through the fixing screw holes of the bulges.

In the inventive direct-current motor, the bulges project outward of an inner peripheral surface of the motor case through the respective windows, and the fixing screw holes are respectively provided in outer portions of the bulges.

In the inventive direct-current motor, the motor case has protuberances respectively provided around the windows and raised inward of the motor case.

The inventive direct-current motor further includes gear support shafts to which planet gears are to be fixed about the rotation shaft, the gear support shafts being provided on an outer surface of the second case facing away from the first case as seen axially of the second case, and the direct-current motor is a motor for an electrically assisted bicycle.

According to another aspect of the present invention, there is provided a hub unit, which includes: a direct-current motor; a hub which accommodates the direct-current motor and is rotatively driven by driving the direct-current motor; and a deceleration mechanism which decelerates rotation of a rotor and transmits the decelerated rotation to the hub.

According to the present invention, the direct-current motor includes a rotor having a rotation shaft, a stator surrounding the rotor, and a motor case which accommodates the stator and retains the stator.

The motor case includes a first case and a second case separable from each other in a direction of an axis of the rotation shaft of the rotor, and the first case and the second case each have a separation edge extending around the stator.

The first case and the second case each have cut-away portions provided at angular positions circumferentially generally equidistantly spaced from each other and each extending parallel to the axis from the separation edge. The separation edge of the first case and the separation edge of the second case each have abutment portions not formed with the cut-away portions, and the abutment portions of the first case respectively abut against the abutment portions of the second case. Thus, the motor case has sufficient strength along the separation edges with the provision of the abutment portions. In the complete motor case including the first case and the second case abutting against each other at the abutment portions, the first case and the second case are maintained in stable positional relation. Therefore, the motor case is free from dimensional variations even with the stator retained therein.

Windows defined by the cut-away portions of the first case and the cut-away portions of the second case are provided in a periphery of the motor case in circumferentially equidistantly spaced relation, and the stator has bulges provided in association with the windows as projecting radially outward from a peripheral surface thereof. The bulges each have a fixing screw hole extending parallel to the axis for fixing the stator to the first case, and the first case has screw holes which are respectively threadingly engaged with distal end portions of screws inserted through the fixing screw holes.

In this case, the bulges of the stator are exposed from the windows of the motor case. Therefore, even if the stator generates heat, the heat can be released from the windows. Further, external air can be taken into the motor case from the windows to cool the stator at the respective bulges.

This prevents the overheat of the stator, and suppresses the dimensional variations.

With the provision of the bulges on the stator, the stator has a greater diameter at the bulges. Therefore, the size of the rotor can be correspondingly increased, permitting the motor to have a higher output and a higher efficiency. Particularly, where the stator has a greater size, the slot length of the stator can be increased. Correspondingly, wires each having a greater diameter can be wound a greater number of turns to form coils in the stator, thereby further increasing the output and the efficiency of the motor.

The bulges project outward of the inner peripheral surface of the motor case through the windows and, therefore, are easily exposed to air outside the motor case. This makes it possible to effectively cool the stator at the bulges.

The stator fixing screw holes are respectively provided in outer portions of the bulges projecting outward of the inner peripheral surface of the motor case. Therefore, the fixing screws are disposed apart from a magnetic path generated by the stator. This prevents the fixing screw holes from interfering with the magnetic path.

Further, protuberances provided around the windows of the motor case and raised inward from the motor case abut against the stator accommodated in the motor case to radially position the stator. Portions of the motor case formed with the protuberances each have a correspondingly greater wall thickness, so that portions of the motor case in abutment against the stator are reinforced.

Further, gear support shafts to which planet gears are to be fixed about the rotation shaft are provided on an outer surface of the second case facing away from the first case as seen axially of the second case. The direct-current motor may be a motor for an electrically assisted bicycle.

BRIEF DESCRIPTION OF DRAWINGS

FIG. 3(b) is a sectional view of the motor 11 as seen in an arrow direction A-A in FIG. 3(a).

DESCRIPTION OF EMBODIMENTS

A specific embodiment of the present invention will hereinafter be described with reference to the attached drawings.

Figure 1:
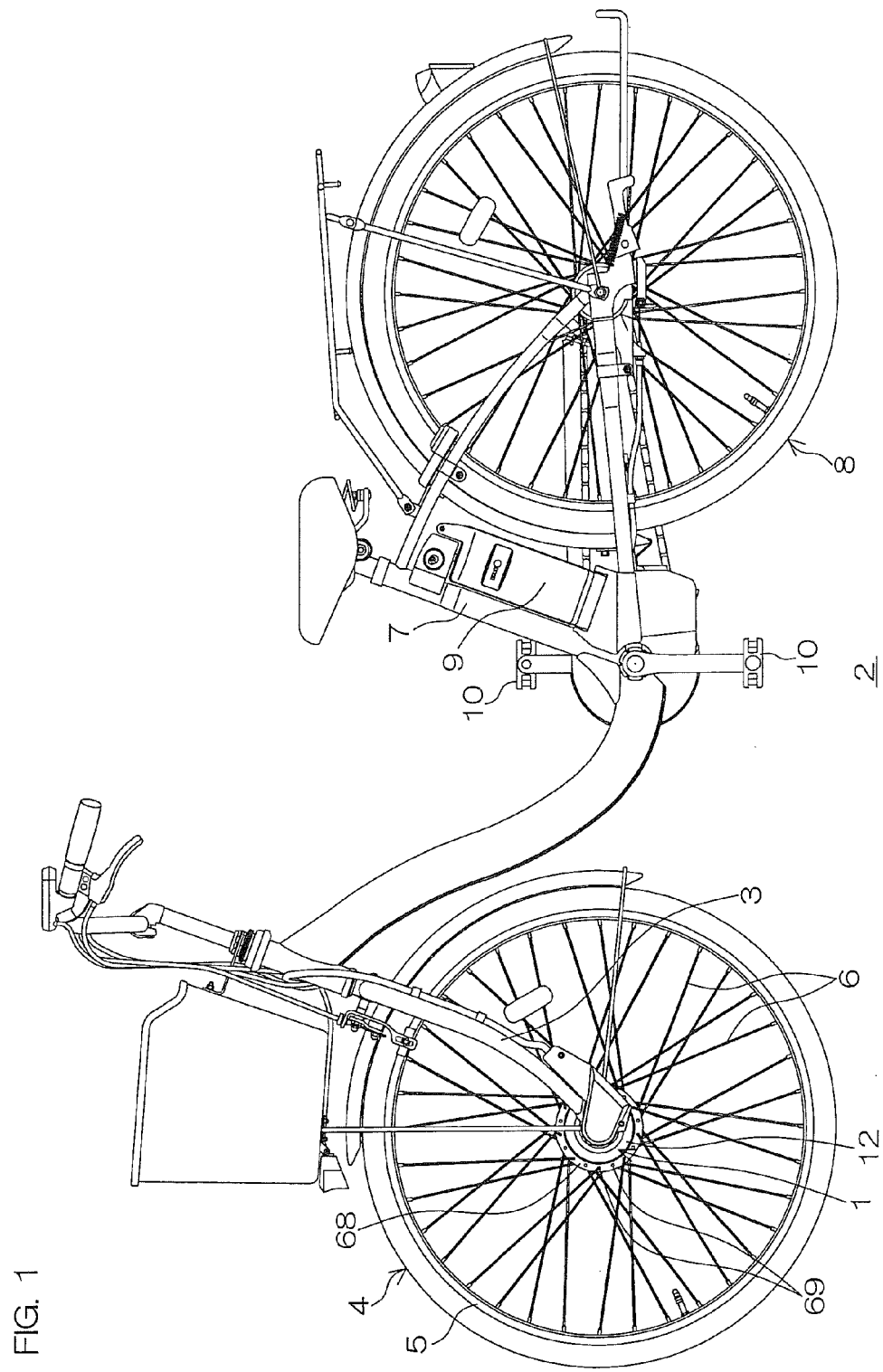
FIG. 1 is a left side view of an electrically assisted bicycle 2 including a hub unit 1 according to one embodiment of the present invention.

FIG. 1 is a left side view of an electrically assisted bicycle 2 including a hub unit 1 according to the embodiment of the present invention.

Referring to FIG. 1, the hub unit 1 is attached to distal ends of a front fork 3 of the electrically assisted bicycle 2, and connected to a rim 5 of a front wheel 4 by spokes 6. In the electrically assisted bicycle 2, a battery 9 is mounted between a seat post 7 and a rear wheel 8. In the electrically assisted bicycle 2, a sensor (not shown) is provided in portion on which a pedaling force of pedals 10 is applied. When the sensor senses, that a load acting on the pedals 10 reaches a predetermined level, power supply to a motor 11 (see FIG. 2 to be described later) of the hub unit 1 from the battery 9 is turned on.

Figure 2:
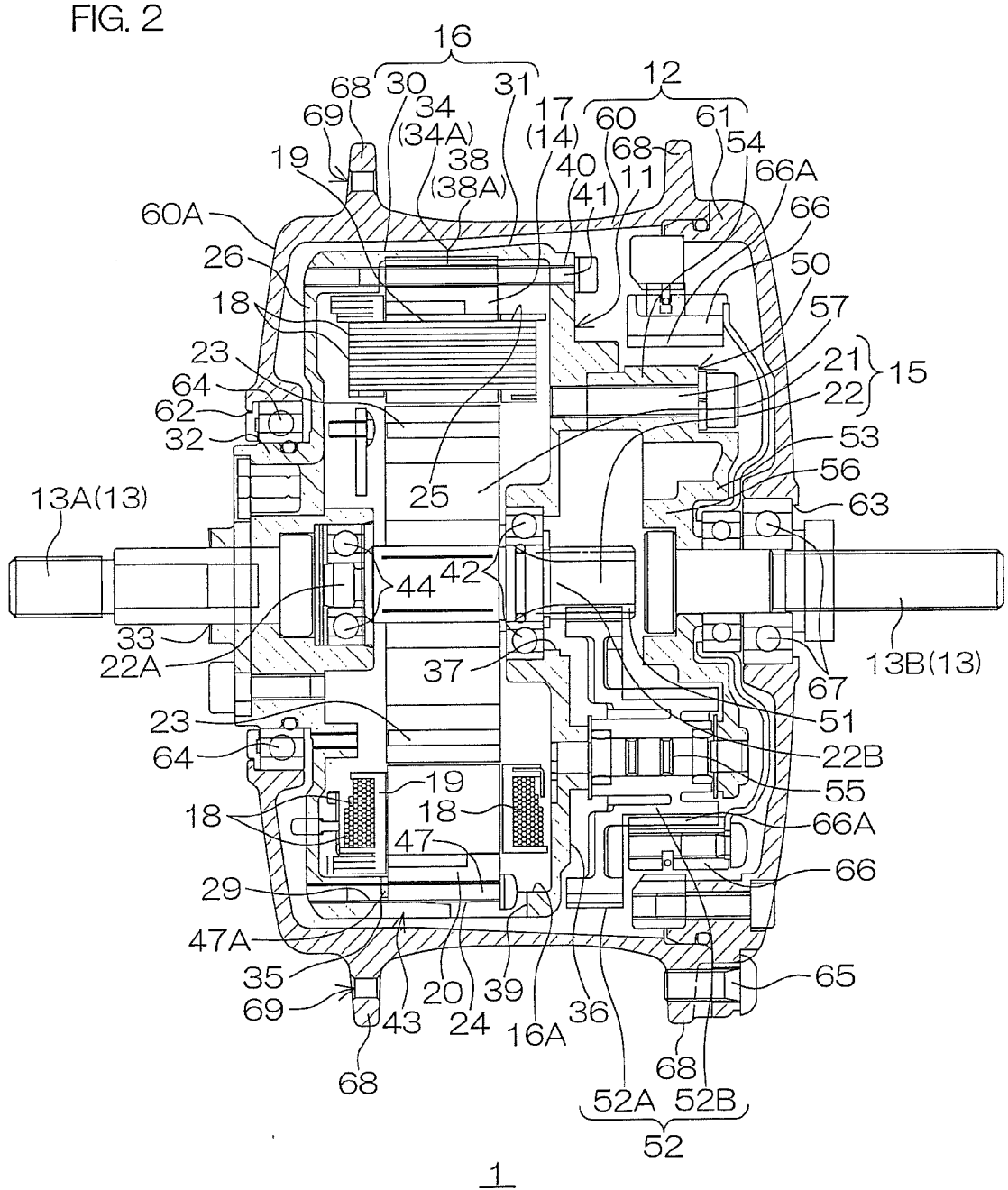
FIG. 2 is a sectional view of the hub unit 1.
Figure 3:
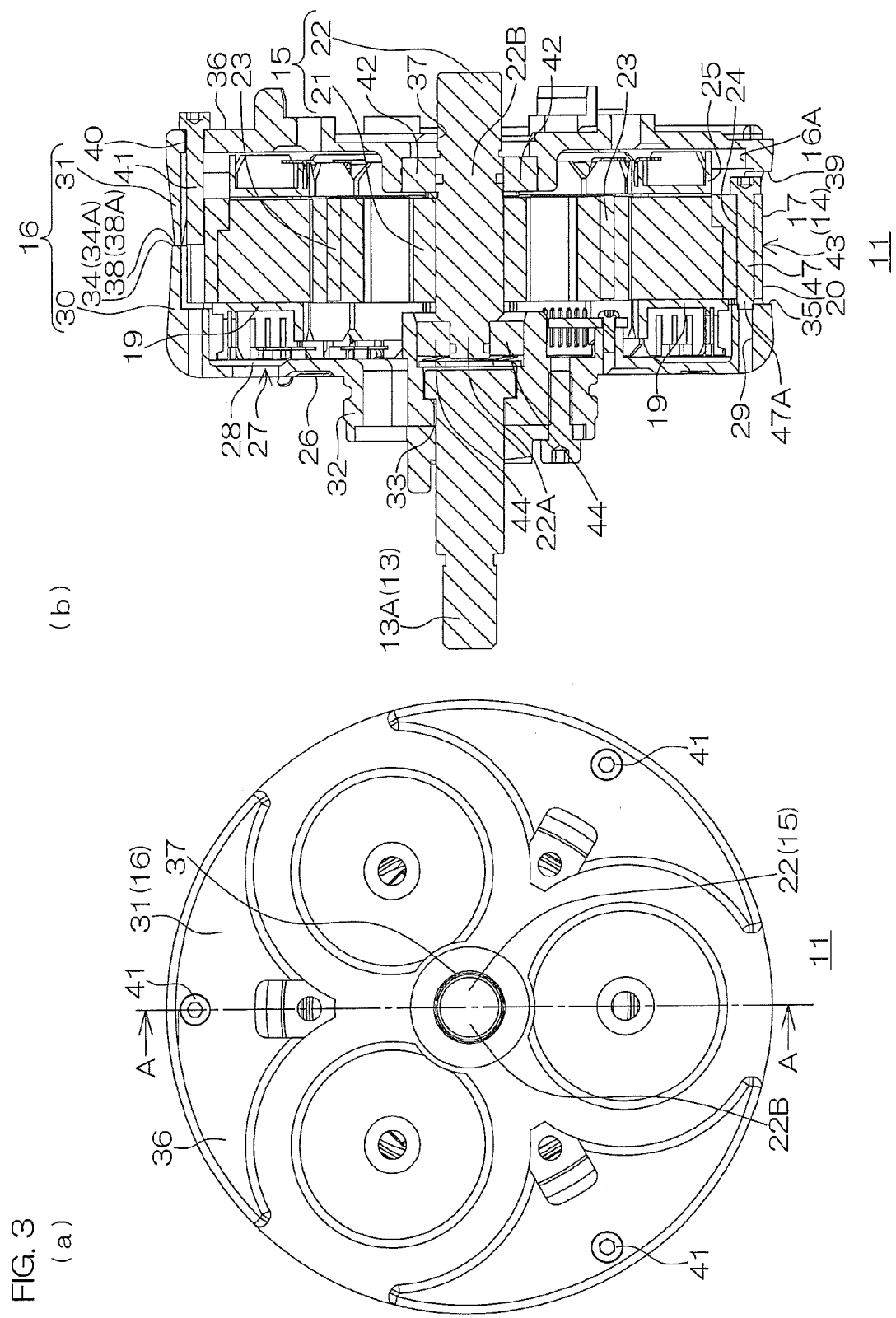
FIG. 3 (a) is a right side view of a motor 11.

FIG. 2 is a sectional view of the hub unit 1. FIG. 3(a) is a right side view of the motor 11, and FIG. 3(b) is a sectional view of the motor 11 as seen in an arrow direction A-A in FIG. 3(a).

Referring to FIG. 2, the hub unit 1 essentially includes the motor 11, a hub 12 which accommodates the motor 11 therein and is rotatively driven by driving the motor 11, and a pair of fixing support shafts 13 for fixing the motor 11 to the front fork 3 of the electrically assisted bicycle 2.

First, the motor 11 will be described. For the description of the motor 11, FIGS. 3(a) and 3(b) will be also referred to.

The motor 11 is a brushless direct-current motor, and includes a stator 14, a rotor 15 and a motor case 16.

The stator 14 includes a yoke 17, and wound wire coils 18 provided in the yoke 17.

The yoke 17 is made of a metal, and has a generally annular shape having a transversely extending center axis as seen in FIG. 2 and a predetermined thickness as measured transversely. The yoke 17 may be a unitary member, or may include a predetermined number of thin metal plates having the same annular shape and stacked one on another. An insulator 25 is provided on an inner peripheral surface of the yoke 17. The yoke 17 includes generally T-shaped teeth 19 provided on the inner peripheral surface thereof in circumferentially equidistantly spaced relation as projecting toward a center of the annular yoke 17 (see FIGS. 8 and 9 to be described later). The wire coils 18 are respectively wound around the teeth 19 (see FIGS. 8 and 9). The yoke 17 provided with the wound wire coils 18 is defined as the stator 14.

The stator 14 has three arcuate bulges 20 integrally provided on an outer peripheral surface thereof in circumferentially equidistantly spaced relation (see FIGS. 5 and 6 to be described later). That is, the bulges 20 (three bulges 20 in this embodiment) project radially outward from the peripheral surface of the stator 14. The bulges 20 each have an elongated fixing screw hole 24 formed in a radially outer portion thereof as extending therethrough parallel to a center axis of the stator 14 (the axis of the stator 14) (see FIG. 2).

The rotor 15 is disposed in the stator 14 (in a hollow portion of the yoke 17) so as to be rotatable coaxially with the stator 14. In other words, the stator 14 surrounds the rotor 15. The rotor 15 integrally includes a metal cylinder 21, and a rotation shaft 22 inserted through the cylinder 21 as extending along a center axis of the cylinder 21 (also see FIG. 9 to be described later). The rotation shaft 22 extends axially of the stator 14 (yoke 17), so that the axis of the stator 14 aligns with the axis of the rotation shaft 22. A plurality of permanent magnets 23 are provided on an outer periphery of the cylinder 21 in circumferentially equidistantly spaced relation as extending parallel to the rotation shaft 22 with their S poles and N poles alternately arranged circumferentially of the cylinder 21 (see FIG. 8 to be described later).

Figure 4:
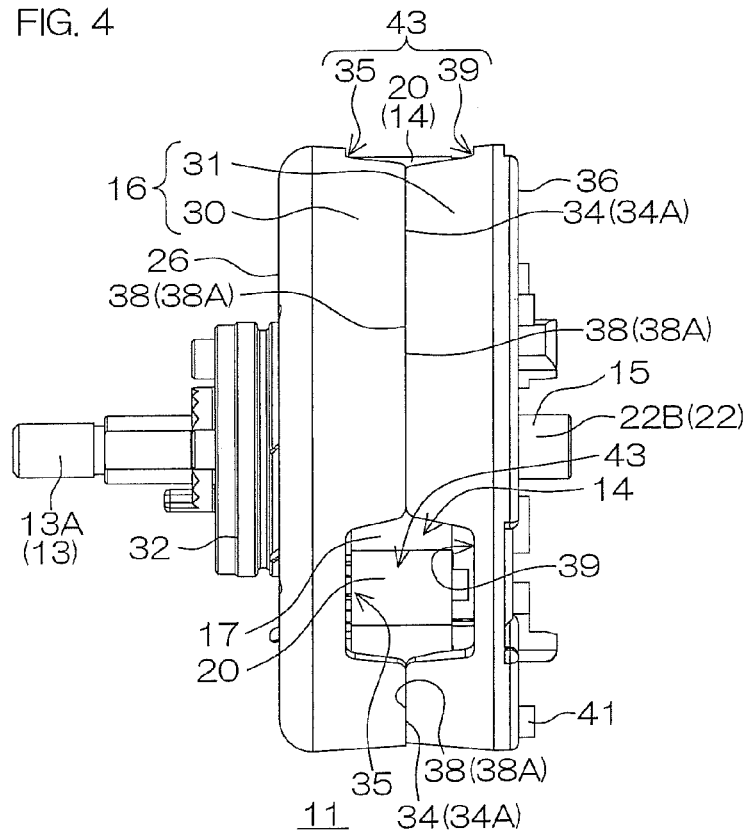
FIG. 4 is a front view of the motor 11.
Figure 7:
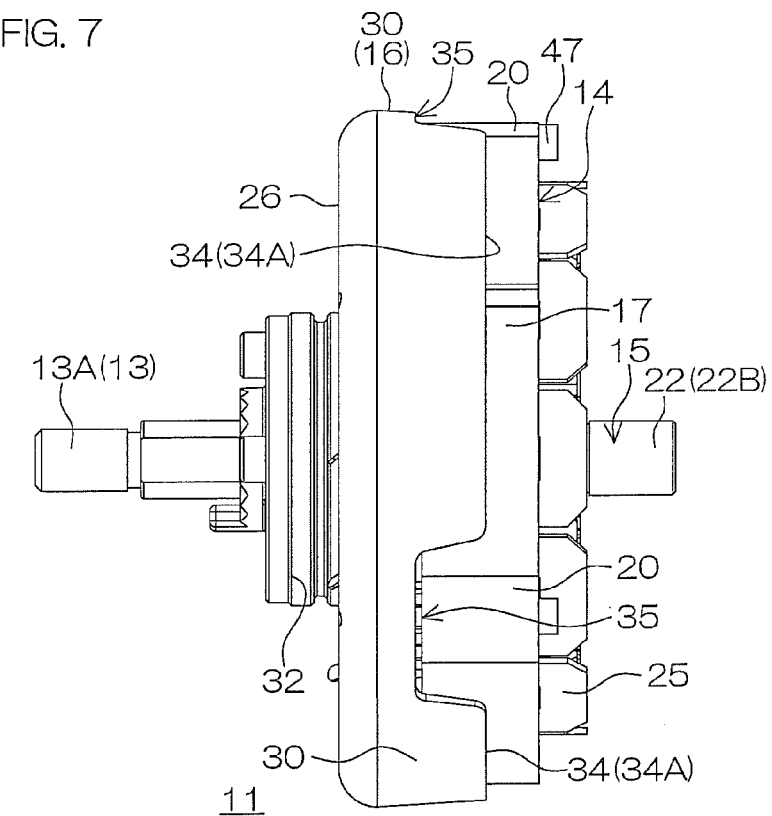
FIG. 7 is a front view of the motor 11 with a second case 31 removed.
Figure 8:
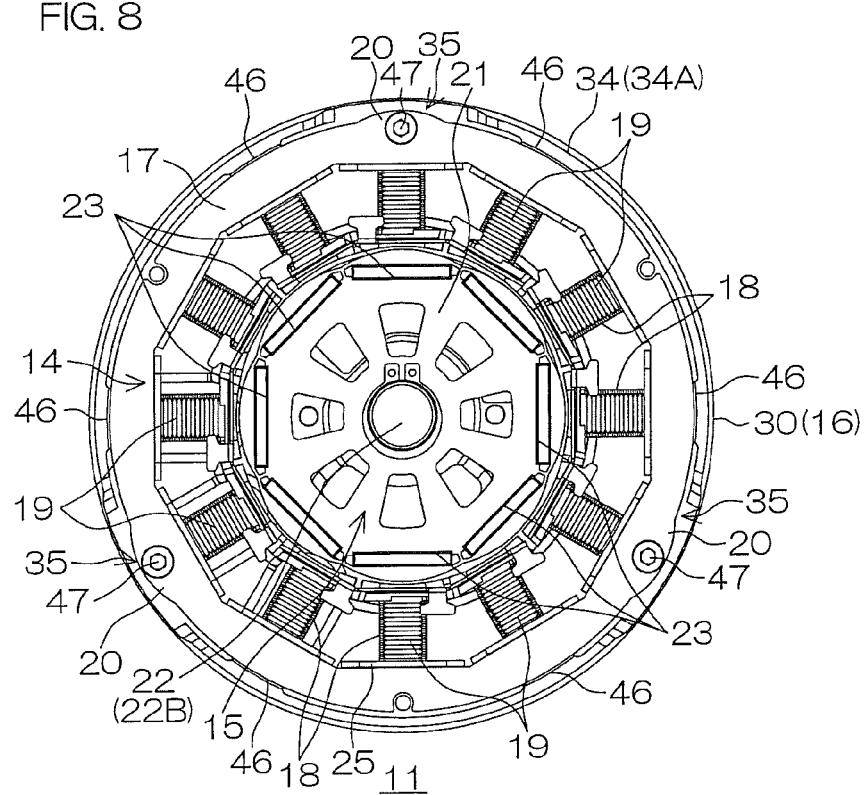
FIG. 8 is a right side view of the motor 11 with the second case 31 removed.
Figure 9:
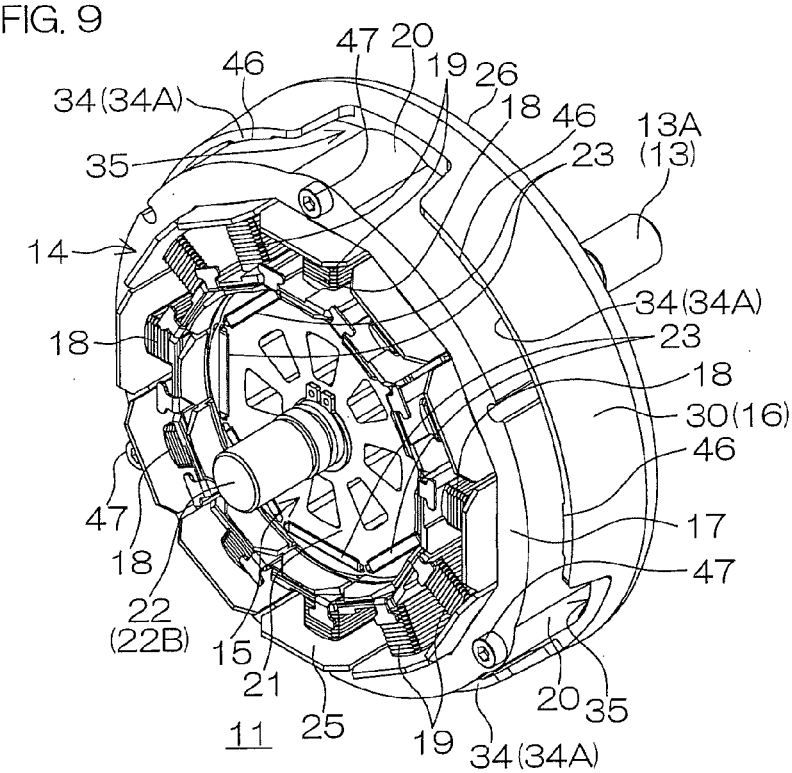
FIG. 9 is a perspective view of the motor 11 with the second case 31 removed.

FIG. 4 is a front view of the motor 11. FIGS. 5 and 6 are perspective views of the motor 11 as seen from different angles. FIG. 7 is a front view of the motor 11 with a second case 31 removed. FIG. 8 is a right side view of the motor 11 with the second case 31 removed. FIG. 9 is a perspective view of the motor 11 with the second case 31 removed.

The motor case 16 accommodates and retains the stator 14 in which the rotor 15 is accommodated, and has a hollow cylindrical shape having a slightly greater size than the stator 14. The motor case 16 includes a first case 30 and a second case 31 which are disposed on a left side and a right side, respectively, in a separable manner as seen in FIG. 4. In FIG. 4, a lateral direction is defined to be the same direction as the axis of the rotation shaft 22 of the rotor 15 (rotor rotation shaft). That is, the motor case 16 is divided into the first case 30 and the second case 31 in a direction of the axis of the rotation shaft 22, and the motor case 16 is divided perpendicularly to the axis of the rotation shaft 22.

As seen in FIG. 7, the first case 30 has a hollow cylindrical shape having an open right side face, and includes a smaller diameter portion 32 having a smaller diameter on its left side. The smaller diameter portion 32 has a through-hole 33 extending axially through a center thereof (see FIG. 3(b)). The first case 30 has a center axis that aligns with the axis of the rotation shaft 22 of the rotor 15.

The first case 30 has an open side edge 34, which defines an open right side portion thereof and serves as a separation edge with respect to the second case 31. The open side edge 34 is located in a flat plane extending perpendicularly to the axis of the first case 30 (radially of the first case 30), and has a circular shape as seen axially of the first case 30 (see FIG. 8). The first case 30 has three cut-away portions 35 circumferentially equidistantly spaced from each other and recessed from the open side edge 34 toward the smaller diameter portion 32. That is, the cut-away portions 35 are disposed at angular positions generally equidistantly spaced along the circumference of the first case 30, and extend parallel to the axis of the first case 30 from the open side edge 34. Portions of the open side edge 34 not formed with the cut-away portions 35 are herein defined as abutment portions 34A.

The cut-away portions 35 each have a generally isosceles trapezoidal shape tapered toward the smaller diameter portion 32 as seen from a radially outer side of the first case 30. The cut-away portions 35 each have rounded four corners. The cut-away portions 35 extend thicknesswise through a peripheral wall of the first case 30 while being recessed toward the smaller diameter portion 32. The first case 30 also has protuberances 46 slightly raised radially inward from an inner peripheral surface of the peripheral wall thereof in the vicinity of the cut-away portions 35 (see FIG. 8). The peripheral wall of the first case 30 has a greater thickness at the protuberances 46.

Figure 5:
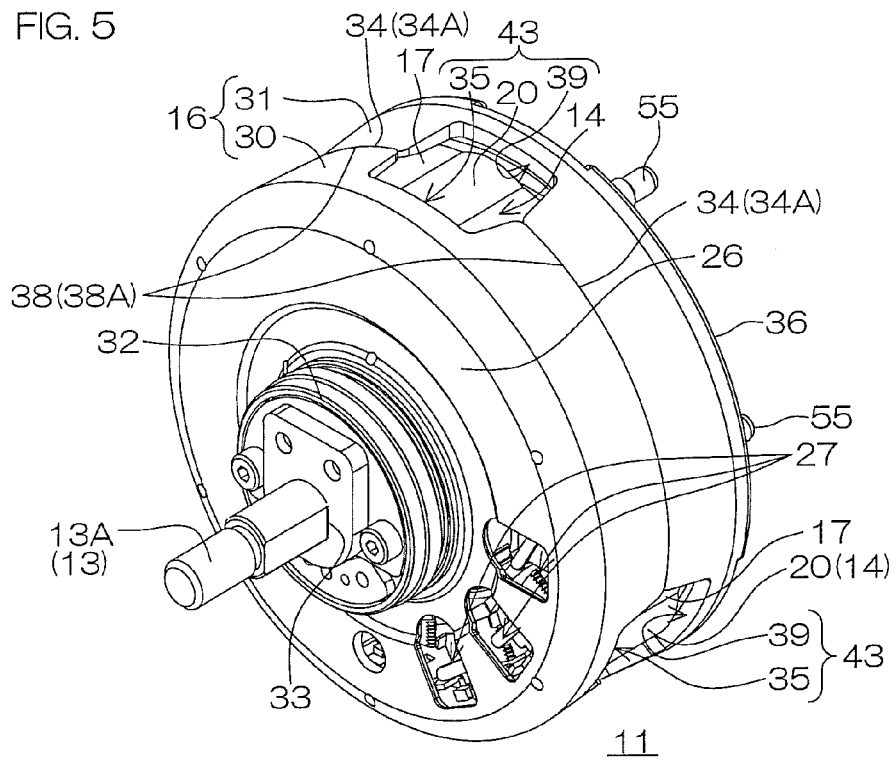
FIG. 5 is a perspective view of the motor 11.
Figure 6:
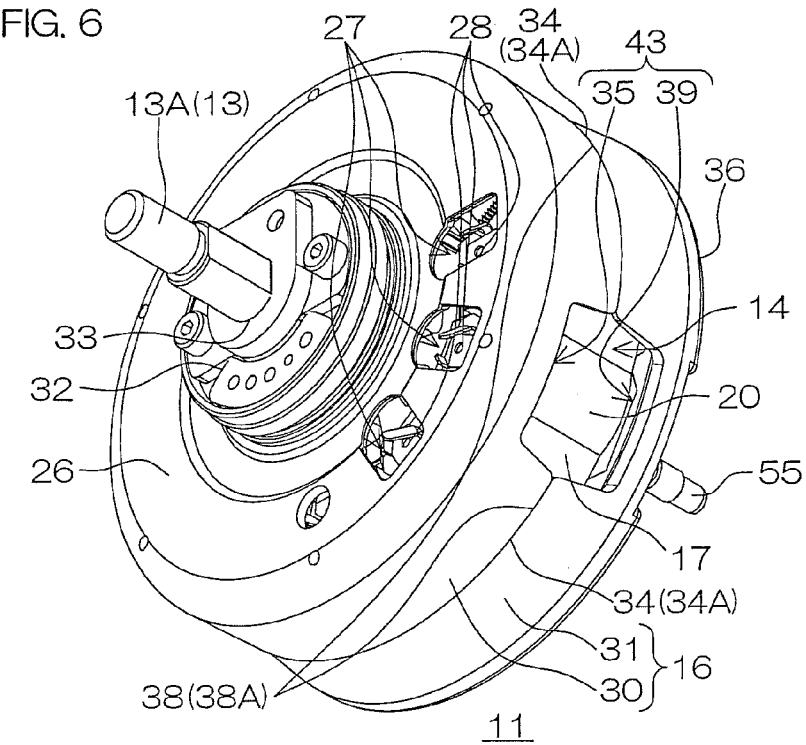
FIG. 6 is a perspective view of the motor 11 as seen from an angle different from that in FIG. 5.

Referring to FIGS. 5 and 6, the first case 30 has an annular flat portion 26 which connects the smaller diameter portion 32 to a portion of the first case 30 located on the right side of the smaller diameter potion 32, and the flat portion 26 has through-holes 27 extending thicknesswise therethrough. In this embodiment, three through-holes 27 are collectively provided in the vicinity of one of the cut-away portions 35.

The flat portion 26 has screw holes 29 provided in a peripheral portion of an inner surface thereof (facing toward the open side edge 34) in association with the cut-away portions 35 as extending parallel to the axis of the first case 30 toward the smaller diameter portion 32 (see FIGS. 2 and 3(b)).

As seen in FIG. 4, the second case 31 has a hollow cylindrical shape having an open left side face and a closed right side face. The first case 30 and the second case 31 have substantially the same outer diameter. The second case 31 has a center axis that aligns with the axis of the rotation shaft 22 of the rotor 15.

The second case 31 has a disk-shaped closure portion 36 which defines the closed right side face, and a through-hole 37 provided at a center of the closure portion 36 as extending axially through the closure portion 36 (see FIG. 3(b)). The second case 31 has an open side edge 38, which defines an open left side portion thereof and serves as a separation edge with respect to the first case 30. The open side edge 38 is located in a flat plane extending perpendicularly to the axis of the second case 31 (radially of the second case 31), and has a circular shape having the same diameter as the aforementioned open side edge 34 of the first case 30 as seen axially of the second case 31. The second case 31 has three cut-away portions 39 circumferentially generally equidistantly spaced from each other and recessed toward the closure portion 36. That is, the cut-away portions 39 are disposed at angular positions generally equidistantly spaced along the circumference of the second case 31, and extend parallel to the axis of the second case 31 from the open side edge 38. Portions of the open side edge 38 not formed with the cut-away portions 39 are herein defined as abutment portions 38A.

The cut-away portions 39 each have a generally isosceles trapezoidal shape tapered toward the closure portion 36 as seen from a radially outer side of the second case 31. The cut-away portions 39 each have substantially the same size as the cut-away portions 35 of the first case 30. The cut-away portions 39 extend thicknesswise through a peripheral wall of the second case 31 while being recessed toward the closure portion 36. The closure portion 36 has three through-holes 40 provided in an outer peripheral portion thereof in circumferentially equidistantly spaced relation as extending thicknesswise therethrough (see FIG. 3(b)).

For retaining the stator 14 in the motor case 16, as shown in FIG. 9, the stator 14 in which the rotor 15 is accommodated is inserted into the first case 30 from the open portion of the first case 30 (surrounded by the open side edge 34). At this time, the bulges 20 of the outer peripheral surface of the stator 14 are respectively fitted in the cut-away portions 35 located at the corresponding circumferential positions in the outer periphery of the first case 30, thereby facilitating the circumferential positioning between the first case 30 and the stator 14.

Upon completion of the insertion, the open side edge 34 (abutment portions 34A) is located along an axially generally middle portion of the outer peripheral surface of the stator 14 with a part of the stator 14 projecting outside the first case 30 (also see FIG. 7). Further, the protuberances 46 provided on the inner peripheral surface of the peripheral wall of the first case 30 in the vicinity of to the cut-away portions 35 abut against the outer peripheral surface of the stator 14, whereby the stator 14 is radially positioned within the first case 30 (see FIG. 8). As described above, the first case 30 has a greater wall thickness at the protuberances 46, so that portions (i.e., the protuberances 46) of the first case 30 to be brought into abutment against the stator 14 are reinforced.

At this time, referring to FIG. 3(b), one end portion 22A (a left end portion in FIG. 3(b)) of the rotation shaft 22 of the rotor 15 accommodated in the stator 14 is inserted into the through-hole 33 of the smaller diameter portion 32 of the first case 30 from the side of the open side edge 34 with a bearing 44 fitted therearound.

Subsequently, screws 47 are respectively inserted into the fixing screw holes 24 of the bulges 20 of the stator 14 from the open side edge 34, and distal ends 47A of the screws 47 are threadingly engaged with the corresponding screw holes 29 of the first case 30 (see FIGS. 2 and 3(b)). Thus, the stator 14 is fixed to the first case 30.

Then, as shown in FIGS. 5 and 6, the second case 31 is engaged with the first case 30 so as to cover the part of the stator 14 projecting outside the first case 30 (see FIGS. 7 and 9). At this time, the bulges 20 of the outer peripheral surface of the stator 14 are respectively fitted in the cut-away portions 39 located at the corresponding circumferential positions in the outer periphery of the second case 31, thereby facilitating the circumferential positioning between the second case 31 and the stator 14.

Upon completion of the insertion, the abutment portions 34A of the open side edge 34 of the first case 30 abut against the abutment portions 38A of the open side edge 38 of the second case 31 along the entire circumference. That is, the first case 30 and the second case 31 are combined with each other with the open side edge 34 (abutment portions 34A) and the open side edge 38 (abutment portions 38A) in abutment against each other. Thus, the motor case 16 is completed. Here, protuberances (not shown) similar to the protuberances 46 (see FIG. 8) of the first case 30 are provided on an inner peripheral surface of the peripheral wall of the second case 31 in the vicinity of the cut-away portions 39. These protuberances abut against the outer peripheral surface of the stator 14, whereby the stator 14 is radially positioned within the second case 31 (see FIGS. 2 and 3(b)).

At this time, the open side edge 34 (abutment portions 34A) of the first case 30 and the open side edge 38 (abutment portions 38A) of the second case 31 abut against each other, and surround the stator 14. The cut-away portions 35 of the first case 30 are respectively continued to the cut-away portions 39 of the second case 31 located at the corresponding circumferential positions. Continuous ones of the cut-away portions 35 and 39 collectively define a rectangular window 43. Three such windows 43, which are defined by the cut-away portions 35, 39, are provided in circumferentially generally equidistantly spaced relation in the peripheral wall of the complete motor case 16 including the first and second cases 30, 31 thus combined together. The number of the windows may be arbitrarily determined.

The inside of the motor case 16 communicates with the outside of the motor case 16 through the windows 43. The bulges 20 provided on the outer peripheral surface of the stator 14 project radially outward of an inner peripheral surface 16A of the motor case 16 through the windows 43 located at the circumferentially corresponding positions (see FIG. 3(b)) to be thereby exposed radially outward of the motor case 16. As shown, the bulges 20 of the stator 14 are respectively located in association with the windows 43.

At this time, the protuberances 46 of the first case 30 (see FIG. 8) described above are respectively combined with the protuberances (not shown) of the second case 31 to surround the windows 43 on the inner peripheral surface of the motor case 16. The protuberances 46 of the first case 30 and the protuberances (not shown) of the second case 31 project inward of the motor case 16 to contact the stator 14 from a radially outer side of the stator 14 (see FIGS. 8 and 9). Thus, the stator 14 can be radially positioned in the motor case 16. Here, the motor case 16 has a correspondingly greater thickness at the protuberances 46 of the first case 30 and the protuberances of the second case 31, so that portions of the motor case 16 to be brought into abutment against the stator 14 are reinforced (see FIG. 8).

At this time, referring to FIG. 3(b), the other end portion 22B (a right end portion in FIG. 3(b)) of the rotation shaft 22 of the rotor 15 is inserted into the through-hole 37 of the second case 31 from the side of the open side edge 38 with a bearing 42 fitted therearound. As seen in FIG. 3(b), a part of the other end portion 22B present on a right side of the bearing 42 projects outward of the closure portion 36 of the second case 31 to the right side.

At this time, terminals 28 attached to the stator 14 are respectively exposed from the through-holes 27 of the flat portion 26 of the first case 30 (also see FIG. 6). Wirings (not shown) can be respectively connected to the terminals 28 through the through-holes 27.

Then, screws 41 are respectively inserted into the through-holes 40 of the closure portion 36 from the outer side (from the right side in FIG. 3(b)) to be engaged with the first case 30. Thus, the first case 30 and the second case 31 are combined with each other with the open side edge 34 (abutment portions 34A) and the open side edge 38 (abutment portions 38A) in abutment against each other, whereby the motor case 16 is completed. Since the abutment portions 34A of the open side edge 34 of the first case 30 abut against the abutment portions 38A of the open side edge 38 of the second case 31, the complete motor case 16 has sufficient strength along the separation edges (open side edges 34, 38) thereof with the provision of the abutment portions 34A, 38A. In the complete motor case 16 including the first case 30 and the second case 31 abutting against each other at the abutment portions 34A, 38A, the first case 30 and the second case 31 are maintained in stable positional relation. Therefore, the motor case 16 is free froth dimensional variations (particularly, axial dimensional variations) even with the stator 14 retained therein.

In this state, the one end portion 22A of the rotation shaft 22 of the rotor 15 is supported in the through-hole 33 of the first case 30 via the bearing 44, and the other end portion 22B of the rotation shaft 22 of the rotor 15 is supported in the through-hole 37 of the second case 31 via the bearing 42. Thus, the rotor 15 is retained in the stator 14 and, in this state, rotatably supported in the motor case 16.

Of the pair of fixing support shafts 13, one fixing support shaft 13A is inserted into the through-hole 33 of the smaller diameter portion 32 of the first case 30 from an inner side (from the right side in FIG. 3(b)), and fixed to the first case 30 in relatively nonrotatable manner. In this state, the fixing support shaft 13A does not contact the one end portion 22A of the rotation shaft 22 of the rotor 15 inserted in the through-hole 33 from the side of the open side edge 34 (from the right side in FIG. 3(b)).

Referring to FIG. 2, a deceleration mechanism for decelerating the rotation of the rotor 15 and transmitting the rotation to the hub 12 is provided outside the second case 31 (on the right side in FIG. 2). One example of the deceleration mechanism is a planetary gear deceleration mechanism 50.

The planetary gear deceleration mechanism 50 includes a single sun gear 51, three planet gears 52, and a planet gear support frame 53 which supports the planet gears 52.

As seen in FIG. 2, as described above, the part of the other end portion 22B of the rotation shaft 22 of the rotor 15 present on the right side of the bearing 42 projects outside the closure portion 36 of the second case 31 to the right side, and the sun gear 51 is provided around this part.

The planet gear support frame 53 includes three tubular legs 54 provided in circumferentially equidistantly spaced relation as projecting toward the closure portion 36 of the second case 31. With the tubular legs 54 in abutment against the closure portion 36 of the second case 31, bolts 57 are respectively inserted in the tubular legs 54 to be engaged with the closure portion 36, whereby the planet gear support frame 53 is fixed to the second case 31.

Three gear support shafts 55 are provided in equidistantly spaced relation along the circumference of the closure portion 36 (second case 31) on an outer surface (a right side surface in FIG. 2) of the closure portion 36 (facing away from the first case 30 as seen axially of the second case 31) as projecting toward the planet gear support frame 53 (also see FIGS. 5 and 6). The gear support shafts 55 respectively rotatably support the planet gears 52. More specifically, the planet gears 52 are respectively attached to the three gear support shafts 55 about the rotation shaft 22 of the rotor 15.

The planet gears 52 each integrally includes a larger gear 52A provided adjacent the second case 31 and a smaller gear 52B provided opposite from the second case 31. The larger gear 52A and the smaller gear 52B are disposed coaxially. The larger gears 52A of the respective planet gears 52 mesh with the sun gear 51 provided around the other end portion 22B of the rotation shaft 22 of the rotor 15. The smaller gears 52B of the respective planet gears 52 mesh with inner teeth 66A provided on an inner peripheral surface of a ring 66 fixed to a cover plate 61 of the hub 12 to be described later.

The planet gear support frame 53 has a boss 56 provided on an inner surface of a center portion thereof. Of the pair of fixing support shafts 13 described above, the other fixing support shaft 13B extends through a center portion of the boss 56 and projects outside (to the right side in FIG. 2). In this state, the fixing support shaft 13B is fixed to the planet gear support frame 53 (i.e., to the second case 31 fixed to the planet gear support frame 53) in a relatively nonrotatable manner.

The hub 12 includes a hub body 60 and the cover plate 61.

The hub body 60 has a generally cup shape having a bottom 60A on the left side in FIG. 2, and an opening on the other side. The cover plate 61 has a disk shape which closes the opening of the hub body 60 from the right side in FIG. 2. The bottom 60A of the hub body 60 has a through-hole 62 provided at a center thereof as extending therethrough. The cover plate 61 has a through-hole 63 provided at a center thereof as extending therethrough.

The hub body 60 covers the motor case 16 and the planetary gear deceleration mechanism 50, and a bearing 64 is provided between an edge of the bottom 60A defining the through-hole 62 and the smaller diameter portion 32 of the first case 30 of the motor case 16.

The cover plate 61 covers the opening of the hub body 60 so as to conceal the planet gear support frame 53 of the planetary gear deceleration mechanism 50, and is fixed to the hub body 60 by a plurality of bolts 65. The annular ring 66 is fixed to an inner surface (left side surface in FIG. 2) of the cover plate 61 coaxially with the fixing support shaft 1313 by screws, and the inner teeth 66A are provided on the inner peripheral surface of the ring 66 to mesh with the smaller gears 52B of the planet gears 52.

The fixing support shaft 13B fixed to the planet gear support frame 53 extends through the through-hole 63 of the cover plate 61 to project outside (to the right side in FIG. 2). A bearing 67 is provided between an edge of the cover plate 61 defining the through-hole 63 and the fixing support shaft 13B.

The hub body 60 has flanges 68 provided at transversely opposite end portions thereof in FIG. 2 as extending along the entire circumference thereof and projecting radially outward from an outer peripheral surface thereof. The flanges 68 each have a plurality of spoke attaching holes 69 regularly provided circumferentially thereof.

In the complete hub unit 1 shown in FIG. 2, the rotation shaft 22 of the rotor 15, the fixing support shaft 13A fixed to the first case 30 of the motor case 16 and the fixing support shaft 13B extending through the cover plate 61 of the hub 12 and fixed to the second case 31 are aligned with each other. In this state, the rotation shaft 22 is kept out of contact with the fixing support shaft 13A and the fixing support shaft 13B.

The fixing support shaft 13A and the fixing support shaft 13B of the hub unit 1 are fixed to the front fork 3 of the electrically assisted bicycle 2 (see FIG. 1) by screws. In this sate, as shown in FIG. 2, a portion of the hub unit 1 (excluding the rotor 15) hatched with diagonal lines extending downward to the right is a stationary portion which does not move together with the fixing support shafts 13, and a portion of the hub unit 1 hatched with diagonal lines extending downward to the left is a rotatable portion which is rotatable about the fixing support shafts 13.

More specifically, when a load greater than a predetermined level acts on the electrically assisted bicycle 2 during the pedaling of the pedals 10 (see FIG. 1), the power supply to the coils 18 of the stator 14 from the battery 9 (see FIG. 1) is turned on to rotate the rotor 15. The sun gear 51 provided around the other end portion 22B of the rotation shaft 22 is also rotated by the rotation of the rotor 15, whereby the planet gears 52 are rotated at fixed positions. The rotation of the planet gears 52 is decelerated and transmitted to the hub 12 via the inner teeth 66A of the ring 66 provided on the inner surface of the cover plate 61, whereby the hub 12 and the front wheel 4 (see FIG. 1) are rotatively driven.

That is, the electrical rotation of the rotor 15 reduces a pedaling force required to be applied to the pedals 10 to drive the electrically assisted bicycle 2 (see FIG. 1).

Here, the coils 18 generate heat due to the power supply to the coils 18, thereby heating the stator 14. Even if the stator 14 is heated, the bulges 20 of the stator 14 exposed outside the motor case 16 through the windows 43 of the motor case 16 in which the stator 14 is retained (see FIGS. 2 to 6) make it possible to directly release the heat out of the motor case 16 from the windows 43 and to cool the stator 14 at the bulges 20 by taking external air into the motor case 16 through the windows 43. Particularly, the bulges 20 project outward of the inner peripheral surface 16A of the motor case 16 through the windows 43 (see FIG. 3(*b*)), so that the bulges 20 are more easily exposed to the air outside the motor case 16. Thus, the stator 14 can be more effectively cooled at the bulges 20. This facilitates heat dissipation from the stator 14 to increase the output and the efficiency of the motor 11.

In the hub 12, air circulation occurs between the inside and the outside of the motor case 16 through the windows 43. Further, air flows into the motor case 16 from the through-holes 27 provided in the flat portion 26 of the first case 30 of the motor case 16, and flows out of the motor case 16 from the window 43 adjacent to the through-holes 27 (see FIGS. 5 and 6). The stator 14 in the motor case 16 is cooled by the air flow.

The outer diameter of the stator 14 can be increased by the bulges 20 projecting through the windows 43. Thus, the slot length can be increased to correspondingly increase the length of the wire coils 18 (or the diameter of the wire coils 18) to be wound around the teeth 19 of the stator 14 and increase the outer diameter of the rotor 15 in the stator 14. This increases the output and the efficiency of the motor 11.

Further, the bulges 20 respectively project in the windows 43, and the fixing screw holes 24 are respectively provided in the outer portions of the bulges 20 projecting outward of the inner peripheral surface 16A of the motor case 16. Thus, the fixing screw holes 24 of the bulges 20 are located as apart as possible from the coils 18 disposed adjacent the inner peripheral surface of the stator 14. Therefore, the fixing screw holes 24 are located away from the flow of magnetic flux generated around the coils 18 of the stator 14 (the magnetic path of the stator 14), thereby preventing the fixing screw holes 24 from interfering with the magnetic path. This also increases the output and the efficiency of the motor 11.

The provision of the windows 43 in the motor case 16 reduces the size and the weight of the motor case 16, thereby reducing the overall size of the motor 11. Here, the overall size of the motor 11 can be further reduced by reducing the size of the bulges 20 of the stator 14 located in the windows 43.

The motor case 16 is produced by combining the first case 30 with the second case 31 with the open side edge 34 in abutment against the open side edge 38. Therefore, even if the yoke 17 of the stator 14 accommodated in the motor case 16 has slight local variations in the thickness thereof, the dimensional accuracy (axial dimensional accuracy) of the motor case 16 is not impaired by an error in the thickness of the yoke 17. Without impairment of the parallelism between the first case 30 and the second case 31, the parallelism between the bearing 44 of the first case 30 and the bearing 42 of the second case 31 is improved. Therefore, the rotor 15 supported by the bearings 42, 44 can be smoothly rotated.

As a result, the stator 14 is supported in the complete motor case 16 including the first case 30 and the second case 31 combined with each other with the abutment portions 34A in abutment against the abutment portions 38A, and the bulges 20 of the stator 14 are exposed through the windows 43 of the motor case 16. This prevents the overheat of the stator 14 while suppressing the dimensional variations.

It should be understood that the present invention be not limited to the embodiment described above, but various modifications may be made within the scope of the present invention defined by the appended claims.

For example, the inventive motor 11 is applicable not only to the electrically assisted bicycle 2 but also to a vehicle such as an electric wheel chair which includes wheels each having a hub to be mounted with the motor and rotatable by the motor.

The embodiment described above is directed to a case in which the hub unit 1 is supported on opposite sides thereof by the fixing support shafts 13A, 13B respectively projecting from opposite ends of the hub 12. However, the hub unit 1 may be supported on one of the opposite sides thereof. In this case, one of the fixing support shafts 13 may be obviated.

INDUSTRIAL APPLICABILITY

The present invention is applicable to a hub unit to be mounted on a wheel of an electrically assisted bicycle or the like and to a direct-current motor to be incorporated in the hub unit.

This application corresponds to Japanese Patent Application No. 2010-170961 filed with the Japan Patent Office on Jul. 29, 2010, the disclosure of which is incorporated herein by reference.

The invention claimed is:

1. A direct-current motor comprising:
a rotor having a rotation shaft;
a stator surrounding the rotor; and
a motor case that accommodates the stator and retains the stator, the motor case including a first case and a second case separable from each other in a direction of an axis of the rotation shaft of the rotor, the first case and the second case each having a separation edge extending around the stator;
wherein the first case and the second case each have cut-away portions provided at angular positions circumferentially generally equidistantly spaced from each other and each extending parallel to the axis from the separation edge;
wherein the separation edge of the first case and the separation edge of the second case each have abutment portions not formed with the cut-away portions, the abutment portions of the first case respectively abutting against the abutment portions of the second case;
wherein the cut-away portions of the first case and the cut-away portions of the second case cooperatively define a plurality of windows that are disposed in a periphery of the motor case in circumferentially generally equidistantly spaced relation;
wherein the stator has a plurality of bulges projecting radially outward from a peripheral surface thereof in association with the windows;
wherein the bulges each have a fixing screw hole extending parallel to the axis for fixing the stator to the first case;
wherein the first case has screw holes that are threadingly engaged with distal end portions of screws inserted through the fixing screw holes of the bulges;
wherein the bulges are fitted in the windows, facilitating circumferential positioning between the stator and the motor case;
wherein the motor case has a plurality of protuberances respectively provided around the windows and raised inward of the motor case; and
wherein the protuberances abut against an outer peripheral surface of the stator.

2. The direct-current motor according to claim 1, wherein:
the bulges project outward of an inner peripheral surface of the motor case through the respective windows; and
the fixing screw holes are respectively provided in outer portions of the bulges.

3. The direct-current motor according to claim 1, further comprising gear support shafts to which planet gears are to be fixed about the rotation shaft, the gear support shafts being provided on an outer surface of the second case facing away from the first case as seen axially of the second case;
the direct-current motor being a motor for an electrically assisted bicycle.

4. A hub unit comprising:
a direct-current motor;
a hub; and
a deceleration mechanism;
the direct-current motor including
a rotor having a rotation shaft;
a stator surrounding the rotor; and
a motor case that accommodates the stator and retains the stator, the motor case including a first case and a second case separable from each other in a direction of an axis of the rotation shaft of the rotor, the first case and the second case each having a separation edge extending around the stator;
wherein the first case and the second case each have cut-away portions provided at angular positions circumferentially generally equidistantly spaced from each other and each extending parallel to the axis from the separation edge;
wherein the separation edge of the first case and the second case each have abutment portions not formed with the cut-away portions, the abutment portions of the first case respectively abutting against the abutment portions of the second case;
wherein the cut-away portions of the first case and the cut-away portions of the second case cooperatively define a plurality of windows that are disposed in a periphery of the motor case in circumferentially generally equidistantly spaced relation;
wherein the stator has a plurality of bulges projecting radially outward from a peripheral surface thereof in association with the windows;
wherein the bulges each have a fixing screw hole extending parallel to the axis for fixing the stator to the first case;
wherein the first case has screw holes that are threadingly engaged with distal end portions of screws inserted through the fixing screw holes of the bulges;

wherein the bulges are fitted in the windows, facilitating circumferential positioning between the stator and the motor case;

wherein the motor case has a plurality of protuberances respectively provided around the windows and raised inward of the motor case;

wherein the protuberances abut against an outer peripheral surface of the stator;

wherein the hub accommodates the direct-current motor and is rotatively driven by driving the direct-current motor; and wherein the deceleration mechanism decelerates rotation of the rotor and transmits the decelerated rotation to the hub.

* * * * *